May 6, 1969  O. M. ULBING ET AL  3,442,177
TORQUE CONTROL SYSTEM

Filed May 2, 1967  Sheet 1 of 2

INVENTORS
OTMAR M. ULBING
ZENONAS KATARSKAS
BY
David W. Tibbott
ATTORNEY

United States Patent Office 3,442,177
Patented May 6, 1969

3,442,177
TORQUE CONTROL SYSTEM
Otmar M. Ulbing, Berkshire, N.Y., and Zenonas Katarskas, South Waverly, Pa., assignors to Ingersoll-Rand Company, New York, N.Y., a corporation of New Jersey
Filed May 2, 1967, Ser. No. 635,496
Int. Cl. F01c 21/12
U.S. Cl. 91—59
8 Claims

ABSTRACT OF THE DISCLOSURE

A power wrench having an automatic torque-responsive system for shutting off the wrench when a fastener reaches a predetermined torque load. The system includes a control air system having a torque-responsive valve mechanism which is normally open to bleed the control air continuously and which closes when the torque load on the fastener reaches the predetermined torque load magnitude. The closing of the torque-responsive valve mechanism creates a signal which closes a motor control valve to stop the motor of the power wrench.

This invention relates generally to the art of driving threaded fasteners and more particularly to a system for automatically stopping a power wrench after the wrench has driven a fastener to a predetermined maximum torque load.

Conventional torque-responsive shut-off systems for power wrenches are relatively inaccurate and cannot be relied on to continuously tighten fasteners to precise torque loads; that is, the sensing of torque by conventional systems is sufficiently inaccurate that the final torque load on a fastener tightened by such systems may vary substantially from the torque load to which the system is adjusted. In general, the inaccuracy of most conventional systems is due to a combination of relatively high frictional losses and large inertia effects, both of which are undesirable in an accurate system for sensing torque.

Second embodiment

The principal object of this invention is to overcome the foregoing problems present in the prior art and to provide a highly accurate system for sensing torque and shutting off a power wrench in response to a predetermined torque load.

Other important objects are: to provide a system which will accurately sense a precise torque load and create a signal in response to the sensed torque load; to provide a power wrench which will tighten fasteners reliably and accurately to a predetermined torque load; and to provide a pneumatically-operated torque sensing system for operating a shut-off mechanism for a power wrench at a predetermined torque load.

In general, these objects are attained in a torque control mechanism including a motor driving a driven member, sensing means connected to the driven member to measure the torque load on the driven member, a fluid signalling system including a fluid passage mounted on the sensing means and containing a normally continuous flow of fluid, and valve means connected to the passage and operative, when the torque load on the driven member rises to a predetermined value, to close off the flow of fluid in the passage to cause the fluid signalling system to create a signal. This signal is connected to a control circuit which is operative, in response to the signal, to stop the motor.

Brief description of drawings

The invention is described in connection with the accompanying drawings wherein.

Description of preferred embodiments

Figure 1:
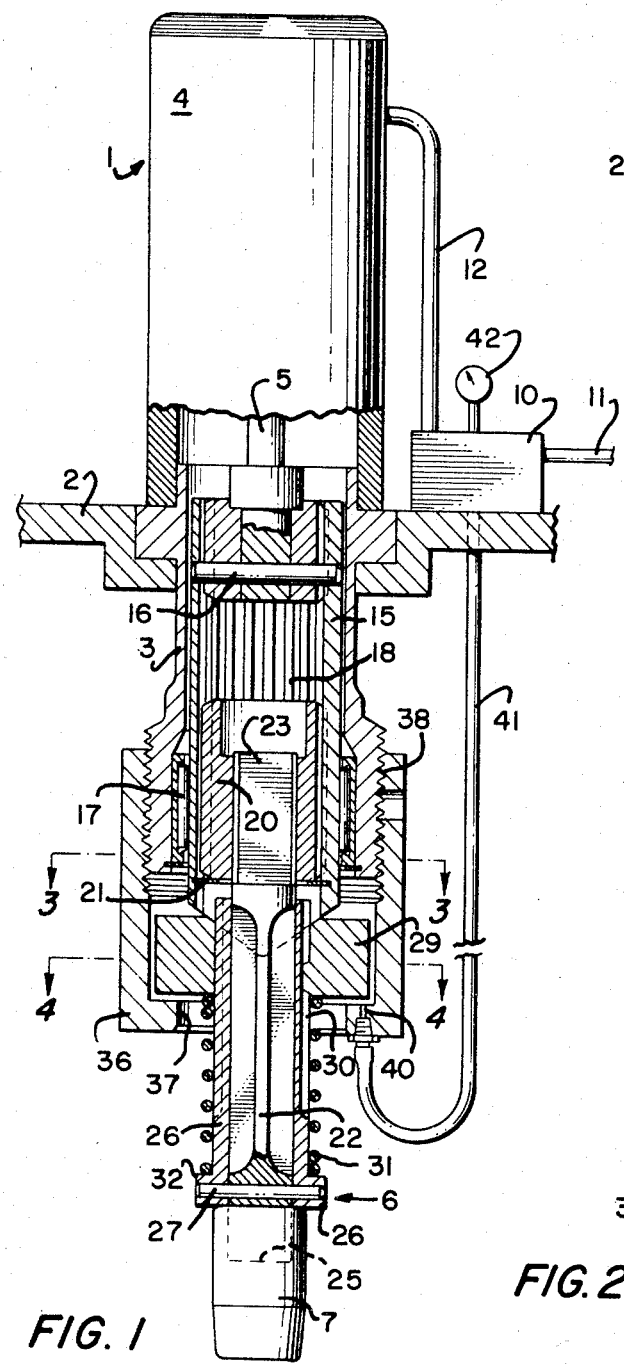
FIG. 1 is an elevational view with portions broken away and shown in section of a power wrench incorporating an embodiment of this invention.
Figure 3:
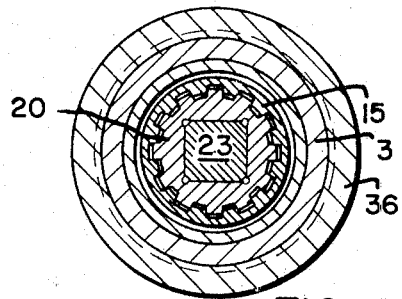
FIG. 3 is a section taken along line 3–3 of FIG. 1.
Figure 4:
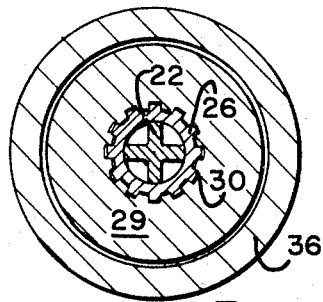
FIG. 4 is a section taken along line 4–4 of FIG. 1.

The power wrench 1 shown in FIG. 1 is mounted on a support 2 and includes a wrench casing 3, a fluid-operated motor 4 having a drive shaft 5 driving a spindle 6. The spindle 6 detachably carries a wrench socket 7 adapted to turn a bolt 8 threaded into a work surface 9. All of the foregoing structure is conventionally found in power wrenches of the "nut runner" type.

A part of the invention in this application rests in a torque sensing mechanism for measuring the torque on the spindle and creating a signal when the torque rises to a predetermined selected value. This signal is useful for operating a torque measuring indicator and for signalling a mechanism to open a clutch and/or to shut off the motor of the power wrench. In addition, the invention includes a control system for utilizing the torque signal to operate an indicating mechanism and to open a clutch or to shut off the motor driving the wrench.

FIG. 1 further illustrates a control box 10 mounted on the support 2 and being supplied with operating fluid through a fluid supply pipe 11. The control box 10 is connected to the motor 4 by a motor hose 12. The control box 10 includes means for controlling the flow of pressure fluid from the supply pipe 11 to the motor hose 12; this means will be described in detail later.

The mechanism forming the torque measuring or sensing system includes a hollow shaft 15 connected to the motor drive shaft 5 by a drive pin 16 and rotatively mounted in the wrench casing 3 by the bearing 17. The hollow shaft 15 is internally splined at 18. A slide shaft 20 is slidably mounted in the hollow shaft 15 and includes external splines meshing with the internal splines 18 in the shaft 15 resulting in the two shafts being slidably keyed together. A lock ring 21 is mounted adjacent the front end of the hollow shaft 15 to serve as a stop for preventing the slide shaft 20 from sliding axially out of the end of the hollow shaft 15.

A torsion bar spring 22 is fixed to the slide shaft 20 by having a square upper end 23 attached in a mating square hole in the slide shaft 20. The torsion bar spring 22 has an X-shaped cross section along its intermediate portion and a square lower end 25 adapted to be detachably attached to the wrench socket 7 in a conventional manner. Also attached to the lower end 25 of the torsion spring 22 is a hollow spindle 26 which surrounds the torsion spring 22 and extends upwardly from it covering substantially the entire intermediate portion of the torsion spring 22 containing the X-shaped cross section. The spindle tube 26 is keyed to the lower end 25 of the torsion spring 22 by a key pin 27.

A sliding valve ring 29 is slidably keyed on the spindle tube 26 by means of cooperating splines 30 formed on the spindle tube 26 and meshing with cooperating flutes formed in the valve ring 29. A relatively light spring 31 is mounted around the spindle tube 26 below the valve ring 29 urging the valve ring upwardly against the forward end of the hollow shaft 15. The front end of the spring 31 is seated against an enlarged flange 32 formed on the front end of the spindle tube 26.

Figure 2:
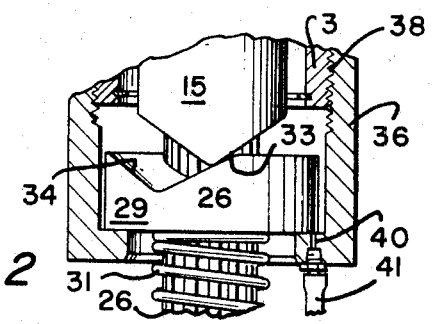
FIG. 2 is a fragmentary view showing a portion of FIG. 1 with certain elements being shown in elevation.

The front end of the hollow shaft 15 includes a V-shaped cam 33 which normally seats in a V-shaped notch 34 formed on the rear face of the sliding valve ring 29. As a result of the cam 33 and cooperating cam notch 34, any relative rotation between the valve ring 29 and the hollow shaft 15 will cause the cam 33 to rotate relative to the cam notch 34 and to ride up the sides of the cam notch 34 and move the valve ring 29 forwardly, as illustrated in FIG. 2. This relative rotation occurs when the torsion bar spring 22 twists under a torque load. As is well known, the strain or twist of the torsion bar 22 will be proportional to the torque stress applied to the torsion bar. Due to the shape of the cam 33 and its meshing notch 34, the valve ring 29 will move forwardly on the spindle tube 26 substantially in proportion to the torque load applied to the torsion bar spring 22. As a result, the axial sliding movement of the valve ring 29 on the spindle tube 26 is a measurement of the torque transmitted by the torsion bar spring 22 and the spindle 6.

The spindle 6 can slide rearwardly in the hollow shaft 15 for a limited distance as a result of the slide shaft 20 being splined in the hollow shaft 15. The spring 31 is relatively light so that it provides little interference with the rearward movement of the spindle 6. The main purpose of the spring 31 is to return the spindle 6 to its forwardly extended position at the end of a fastener driving cycle and to urge the sliding valve ring 29 rearwardly against the cam 33.

A housing cap 36 is located over the spindle 6 with the spindle 6 extending through a central opening 37 provided in the cap 36. The cap 36 is threaded on the lower end of the wrench casing 3 by means of a threaded joint 38. A bleed port or outlet 40 is formed in the front end of the cap 36 over the forward face of the valve ring 29. The bleed port 40 is connected to the control box 10 by a control hose 41. The bleed port 40 is positioned so that it can be closed by the sliding valve ring 29 when the valve ring 29 is moved forwardly as shown in FIG. 2, as a result of a torque load applied to the torsion spring 22 causing it to twist. The housing cap 36 can be adjusted on the threads 38 to vary the normal spacing between the bleed port 40 and the valve ring 29 in order to adjust the precise torque load at which the valve ring 29 closes the bleed port 40. A pressure gage 42 is mounted on the control box 10 and connected to the control hose 41 for providing a measurement of torque. The gage 42 can be calibrated in foot-pounds to provide a direct torque measurement.

Figure 5:
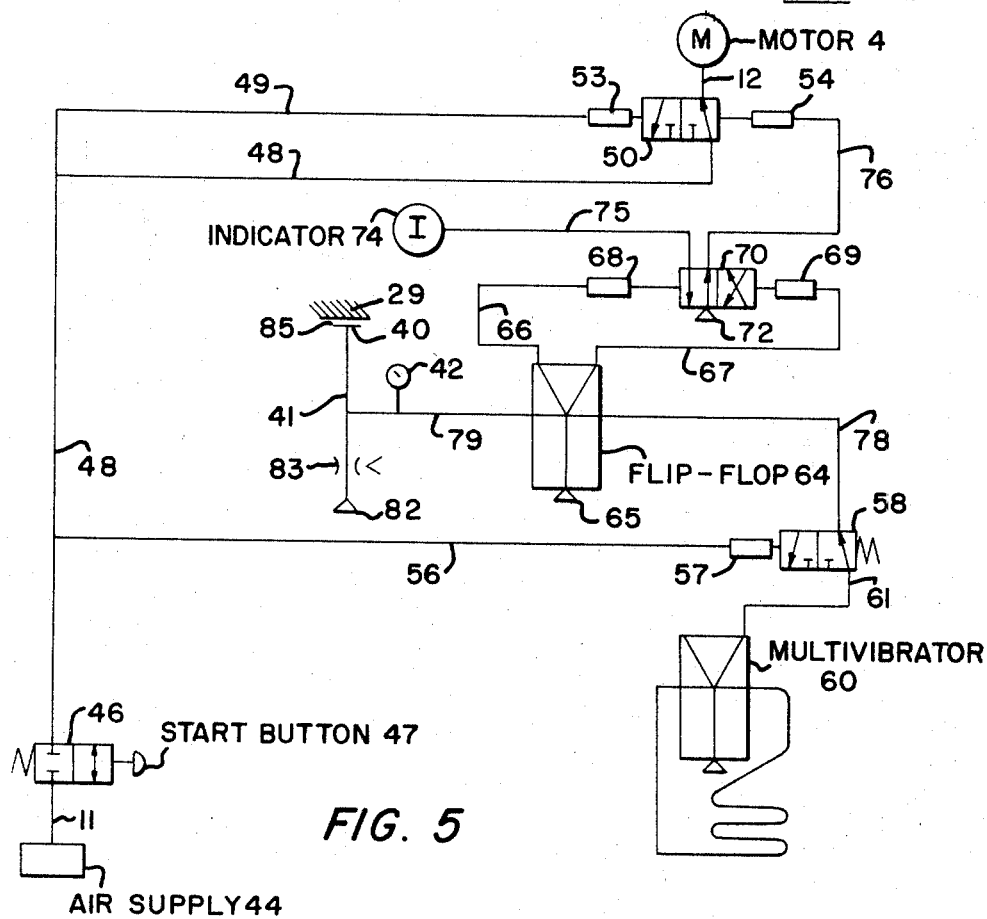
FIG. 5 is a schematic diagram of an air system for controlling the power wrench shown in FIG 1.

FIG. 5 schematically illustrates the control system for the power wrench 1 shown in FIGS. 1 to 4. Air pressure is supplied from an air supply 44 through the supply pipe 11 to a normally-closed throttle valve 46. The throttle valve 46 has a push button 47 which is pressed down by an operator to open the throttle valve 46. When open, the throttle valve 46 supplies air pressure to the main air line 48 which extends to one side of a motor slide valve 50. The other side of the slide valve 50 is connected by the motor hose 12 to the power wrench motor 4. The slide valve 50 is moved in alternate directions by respective air-operated actuators 53 and 54. In general, these actuators include a cylinder containing a reciprocating piston. FIG. 5 shows the motor slide valve 50 in a position wherein the air line 48 is connected to the motor 4. The actuator 53 is connected to the main air line 48 by an air line 49. The actuator 53 receives air pressure when the throttle valve 46 is opened and, as a result, urges the motor slide valve 50 away from it to the alternate position of that shown in FIG. 5. However, it does not move at this time, as will be seen later.

The main air line 48 is also connected by a line 56 to an actuator 57 which is adapted to close a normally-open slide valve 58. When air pressure is vented from the actuator 57, the slide valve 58 has a spring which urges it to an open position, as shown in FIG. 5. The slide valve 58 is closed when the throttle valve 46 is opened.

The system contains a pair of fluidic circuit elements, namely, a multivibrator 60 and a flip-flop 64. As is well known to the people skilled in fluidic circuits, these circuit elements act in the same manner as electronic circuits carrying the same names. The flip-flop circuit 64 includes a separate air source 65 which flows continuously to a pair of branch lines 66 and 67, which are connected, respectively, to actuators 68 and 69 controlling a pilot slide valve 70. In the position shown in FIG. 5, the pilot slide valve 70 interconnects an air pressure source 72 to a line 76 extending to the actuator 54 for the motor slide valve 50. Also in this position of the pilot slide valve 70, an indicator 74 is vented through a line 75 extending to the pilot slide valve 70. In the alternate position of the pilot slide valve 70, the air source 72 is connected to the indicator 74 and the actuator 54 is vented.

In the position of the pilot slide valve 70 shown in FIG. 5, wherein the air source 72 is connected to the actuator 54, the motor slide valve 50 is forced to remain in the position shown in FIG. 5, wherein the main line 48 is connected to the motor 4. This is due to the fact that when pressurized, the actuator 54 is stronger than the actuator 53. As a result, the actuator 53 does not move the motor slide valve 50 to the alternate position of that shown in FIG. 5 until the actuator 54 is vented.

The indicator 74 is of the type that signals that a nut-turning cycle is finished when it is connected to the air source 72, which occurs in the alternate position of the pilot slide valve 70 of that shown in FIG. 5.

The flip-flop circuit 64 includes two control or signal lines 78 and 79. The signal line 78 is connected through the normally-open slide valve 58 to a line 61 extending to the multivibrator 60. When the slide valve 58 is open, as shown in FIG. 5, the multivibrator 60 supplies a signal pulse to the flip-flop circuit 64 causing it to supply an increased fluid pressure to the branch line 66 leading to the actuator 68 of the pilot slide valve 70. This increased pressure in the actuator 68 urges the pilot slide valve 70 to its right hand position as shown in FIG. 5. The main purpose of the slide valve 58 and the multivibrator 60 is to return the pilot slide valve 70 to the position shown in FIG. 5 after the completion of a nut-turning operation whereby the power wrench is ready to be used to turn additional fasteners.

A pressure source 82 is connected through an adjustable restriction 83 to the control line 79 for the flip-flop circuit 64. The control line 79 is normally vented through the control hose 41 and vent or bleed port 40 which were described in connection with FIG. 1. FIG. 5 schematically illustrates the normal air gap 85 existing between the vent port 40 and the sliding valve ring 29. So long as the air gap 85 remains, the air pressure supplied by the source 82 continuously exhausts through the vent port 40 without supplying a signal to the control line 79.

However, when the air gap 85 is closed or partially closed by the valve ring 29, a pressure impulse flows through the control line 79 to the flip-flop circuit 64, resulting in the creation of an increased pressure in the branch line 67 extending to the actuator 69. The flip-flop circuit 64 can be adjusted to operate upon a partial closing of the air gap 85. This results in moving the pilot slide valve 70 to its alternate position wherein the air source 72 is disconnected from the actuator 54 for the motor slide valve 50 and is connected to the indicator 74. This results in the indicator 74 moving to a position indicating the end of the nut-turning operation and in the motor slide valve 50 moving to its alternate position cutting off the air supply to the motor 4. At this time, the cycle for the power wrench 1 is completed.

After this, the operator will close the throttle valve 46 resulting in the slide valve 58 returning to its open position wherein the multivibrator 60 can again supply a signal impulse to the flip-flop circuit 64. This signal impulse will cause an increased pressure in the branch line 66 resulting in the pilot slide valve 70 returning to the position shown in FIG. 5, wherein the pressure source 72 is again connected to the actuator 54 of the motor slide valve 50. This will result in returning the motor slide valve 50 to its open position shown in FIG. 5, wherein the motor 4 is again connected to the air line 48 preparatory for the next time the operator opens the throttle valve 46.

*Operation*

Prior to use of the power wrench 1, it is assumed that the housing cap 36 on the forward end of the wrench casing 3 is properly adjusted to shut off the wrench motor 4 when a predetermined selected torque load is reached during the turning of the fastener 8. Prior to opening the throttle valve 46, the slide valves 50, 58 and 70 are in the positions shown in FIG. 5. To start the operation, the operator places the wrench socket 7 over the fastener 8 and presses the push button 47 to open the throttle valve 46. With the introduction of air pressure into the main air line 48, the slide valve 58 is closed by the actuator 57 and the actuator 53 is pressurized; however, the actuator 53 does not move the motor slide valve 50 at this time, due to the presence of air pressure in the actuator 54. At the same time, air pressure flows through the motor slide valve 50 to the wrench motor 4 to begin turning the fastener 8.

Thereafter, the wrench continues to turn the fastener 8 until the torque load on the torsion bar spring 22 rises to the predetermined value selected to shut off the wrench motor 4. When the torque load reaches this value, the torsion bar spring 22 twists sufficiently to cause the spindle tube 26 to rotate relative to the hollow shaft 15 and to move the valve ring 29 axially forward to close or partialy close the vent port 40.

The closing of the vent port 40 creates a signal in the control line 79 flowing to the flip-flop circuit 64. This signal causes the flip-flop circuit 64 to increase the air pressure in the branch line 67 extending to the actuator 69 which, in turn, moves the pilot slide valve 70 to the alternate position of that shown in FIG. 5. In this alternate position, the actuator 54 is vented while the air source 72 is connected to the indicator 74. The venting of the actuator 54 allows the actuator 53, previously loaded when the throttle valve 56 was opened, to move the motor slide valve 50 to the alternate position of that shown in FIG. 5 wherein the motor 4 is cut off from the main line 48. This causes the wrench motor 4 to stop. The connection of the indicator 74 to the pressure source 72 causes the indicator to signal that the fastener turning cycle is completed. At this time, the operator can withdraw the wrench 1 from the fastener 8 and allow the throttle valve 46 to return to a closed position.

The closing of the throttle valve 46 vents the main air line 48 allowing the slide valve 58 to return to its normally open position wherein the multivibrator 60 is connected to the control line 78 of the flip-flop circuit 64. The receival of the signal of the multivibrator 60 by the flip-flop circuit 64 creates an increase in air pressure in the branch line 66 causing the actuator 54 to return the pilot slide valve 70 to the position shown in FIG. 5, wherein the indicator 74 is vented and the pressure source 72 is connected to the actuator 54 for the motor slide valve 50. Once pressurized, the actuator 54 returns the motor slide valve 50 to the position shown in FIG. 5 wherein the motor 4 is connected to the main air line 48. At this time, the control system is in readiness for a further wrench operating cycle.

*Second embodiment*

Figure 6:
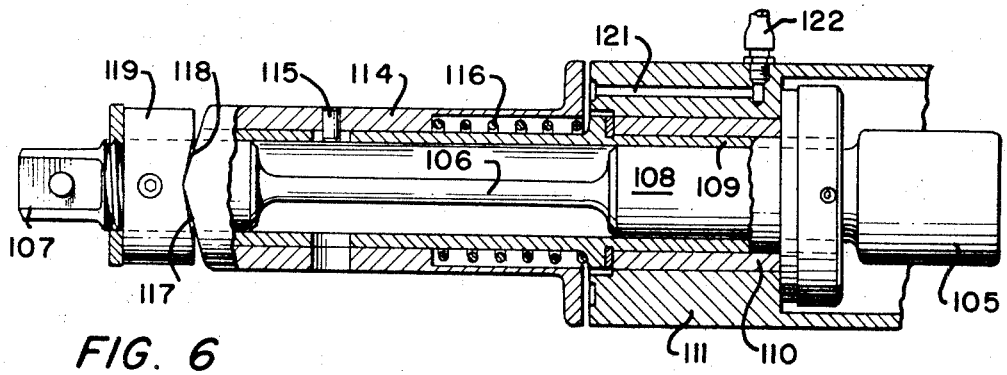
FIG. 6 is an axial section similar to FIG. 1 and showing a second embodiment of the invention.

The second embodiment shown in FIG. 6 includes a drive shaft 105 driven by a wrench motor (not shown) and connected to a torsion bar spring 106 which carries a lower end 107 adapted to be attached to a conventional wrench socket. The torsion bar spring 106 has an upper end 108 connected to a spindle tube 109 which extends over the intermediate portion of the torsion bar spring 106. The spindle tube 109 is rotatably mounted in a bearing 110 carried by a casing 111. A valve sleeve 114 is slidably keyed on the spindle tube 109 by a key pin 115.

The valve sleeve 114 is urged axially forward by a spring 116 disposed between a shoulder on the valve sleeve 114 and a shoulder on the spindle tube 109. The forward end of the valve sleeve 114 carries a V-shaped cam lobe 117 engaging or fitting in a V-shaped cam notch 118 provided in a cam follower ring 119. The cam follower ring 119 is fixed on the forward end 107 of the torsion bar spring 106.

When the torsion bar spring 106 twists under a torque load, the valve sleeve 114 is rotated relative to the cam follower ring 119 to cause the cam lobe 117 to rise out of the cam notch 118, and to move the valve sleeve 114 axially rearward on the spindle tube 109. The casing 111 is provided with a vent port 121 connected to a control hose 122. The vent port 121 opens forwardly and is positioned adjacent the rear end of the valve sleeve 114 so that it is closed by the rearward movement of the valve sleeve 114.

As a result of this construction, a torque load transmitted by the torsion bar spring 106 will cause it to twist, resulting in the valve sleeve 114 rotating relative to the cam follower ring 119 and moving axially rearward to close the vent port 121, thus creating a fluidic signal in the same manner as in the first embodiment.

Although two preferred embodiments of the invention are illustrated and described in detail, it should be understood that the invention is not limited simply to these embodiments, but contemplates other embodiments and variations which utilize the concepts and teachings of this invention.

We claim:
1. A torque measuring mechanism comprising:
a driven member;
sensing means connected to said driven member to measure the torque load on said driven member;
a fluid signaling system including a fluid outlet mounted on said mechanism and exhausting a normally continuous flow of fluid;
valve means connected to said outlet for varying and restricting the flow of fluid from said outlet; and
said valve means being connected to said sensing means and operative, when the torque load on said driven member rises to a predetermined value, to throttle the flow of fluid from said outlet and cause said fluid signaling system to create a signal in response to said predetermined value of torque.
2. The mechanism of claim 1 including:
a motor driving said driven member; and
motor control means operative to stop said motor in response to said signal created by said fluid signaling system.
3. The mechanism of claim 2 wherein:
said motor is fluid-operated; and
said motor control means includes a valve for supplying driving fluid to said motor and operative to close in response to said signal.
4. A torque control mechanism comprising:
a driving member;
a driven member;
a torsion spring interconnecting said members and allowing said members to rotate relative to each other through a limited angle determined by the torque load on said members;
a fluid control system including a fluid outlet mounted on said mechanism and normally exhausting a continuously flowing fluid;
valve means movably mounted on said mechanism and connected to said outlet for varying and restricting the fluid flow from said outlet;
a valve operator slidably keyed on one of said members to rotate with said one member and connected to said valve means to slide axially on said one member to operate said valve means to throttle the fluid flow from said outlet; and
a cam member mounted on said other member and engaging said valve operator to cause it to slide axially and to operate said valve means to restrict the fluid flowing from said outlet when said members rotate relative to each other through a predetermined angle by winding said torsion spring.

5. The mechanism of claim 4 including:

a fluid-operated motor driving said driving member; and a valve supplying driving fluid to said motor and operative to close in response to the throttling of said valve means in said fluid control system.

6. The mechanism of claim 5 including:

spring means urging said valve operator against said cam member away from said outlet.

7. The mechanism of claim 6 wherein:

said driven member is slidably mounted on said driving member; and said spring means acts to urge said driven member forwardly from said driving member.

8. A power tool for driving a fastener and including a torque control mechanism, comprising:

a rotary motor connected to a driving member;

a driven member adapted to be connected to a fastener;

a torsion spring interconnecting said members and resiliently allowing said members to rotate relative to each other through a limited angle determined by the torque load on said member;

a fluid signaling system including a fluid outlet mounted on said mechanism and normally exhausting a continuously flowing fluid, said fluid signaling system being operative to create a signal in response to the restricting of flow from said outlet;

valve means movably mounted on said mechanism and connected to said outlet for varying and restricting the fluid flow from said outlet;

a valve operator slidably keyed on one of said members to rotate with said one member and connected to said valve means to slide axially on said one member to operate said valve means to throttle the flow from said outlet when the torque load on said members rises to a predetermined value;

a cam member mounted on said other member and engaging said valve operator to cause it to slide axially and to operate said valve means to restrict the fluid flowing from said outlet when said members rotate relative to each other through a predetermined angle by winding said torsion spring, thereby causing said signaling system to create a signal indicating the rise of torque to said predetermined value of torque; and means operative in response to said signal to stop said rotary motor.

References Cited

UNITED STATES PATENTS

| | | | |
|---|---|---|---|
| 2,725,918 | 12/1955 | Deshler | 91—59 |
| 2,964,151 | 12/1960 | Eckman | 91—59 X |
| 3,162,250 | 12/1964 | Sindelar | 91—59 X |
| 3,180,612 | 4/1965 | Spyridakis et al. | 253—1 |
| 3,195,704 | 7/1965 | Linsker | 91—59 X |
| 3,279,484 | 10/1966 | Brinkel | 253—2 X |
| 3,322,205 | 5/1967 | Amtsberg et al. | 253—2 X |
| 3,373,824 | 3/1968 | Whitehouse | 91—59 X |

EVERETTE A. POWELL, JR., *Primary Examiner.*

U.S. Cl. X.R.

253—1